Figure 1:
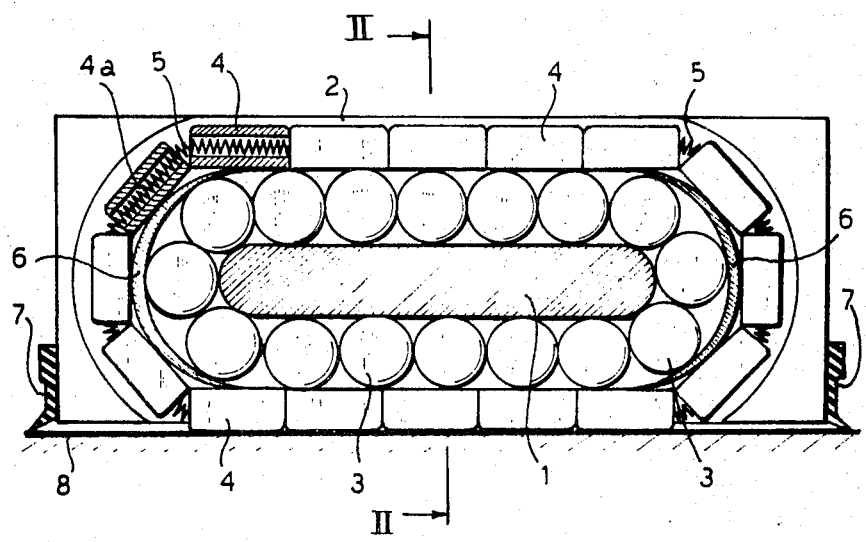

United States Patent
Pepi

[15] 3,645,588
[45] Feb. 29, 1972

[54] ROLLING SLIDES

[72] Inventor: Guglielmo Pepi, Vico Canavese, Turin, Italy

[22] Filed: Mar. 30, 1970

[21] Appl. No.: 23,662

[30] Foreign Application Priority Data

Mar. 31, 1969 Italy .................................. 51224A/69

[52] U.S. Cl. .................................................. 308/6 C
[51] Int. Cl. ............................................... F16c 19/00
[58] Field of Search ....................................... 308/6 C

[56] References Cited

FOREIGN PATENTS OR APPLICATIONS 286,214 10/1952 Switzerland ............................... 308/6

Primary Examiner—Martin P. Schwadron
Assistant Examiner—Frank Susko
Attorney—Sughrue, Rothwell, Mion, Zinn & Macpeak

[57] ABSTRACT

A rolling slide has a bearing body supported by rolling elements which roll both on a closed surface of the body and on an internal surface of an endless belt surrounding the body. The endless belt is made up of a number of resiliently interconnected shoes some of which rest directly on the surface over which the slide moves.

7 Claims, 2 Drawing Figures

ROLLING SLIDES

This invention relates to a slide having a rolling action.

The use of recirculating rolling elements for supporting and guiding moving machine components is well known, particularly where there is a need for precision of movement combined with low friction and the absence of "stick-slip", that is to say, limiting friction phenomena which give rise to nonuniform or intermittent sliding movement.

The use of rolling elements, in contrast with direct sliding of the relatively moving parts on one another, reduces the frictional resistance to movement by replacing the direct sliding friction by rolling friction. The surface area of rolling contact when rolling elements are employed is, however, considerably less than the surface area of contact in the case of direct sliding contact, and consequently the rolling elements should have an enhanced superficial hardness usually of the order of 60 HRC and never less than 55 HRC: such hardness moreover should extend to a sufficient depth below the surface in view of the large contact faces.

An object of the present invention is to provide an improved rolling action slide of high efficiency.

In particular, it is an object of the invention to provide a rolling action slide which does not require the use of a tempered steel roller guide, but in which steel of the "rolling" grade usually employed in guides can be used, having a hardness of the order of 200 to 300 Hb, without damage resulting.

The principle employed in the rolling action slide of this invention is that of providing an endless belt as the surface on which the rolling elements roll. This permits a wider distribution of the surface loads.

Accordingly, the present invention provides a slide having a bearing body which is supported and guided for movement by a number of rolling elements which roll over a surface of the bearing body, characterized in that the rolling elements roll on an internal surface of an endless belt made up of a number of support members interconnected by means permitting separation of the members at the extremes of the endless belt.

The rolling elements may be of any convenient shape and may have the same or different diameters. For example, the rolling elements may comprise: cylindrical rollers having parallel axes, cylindrical rollers having nonparallel axes, single or double tapered frustoconical rollers; rollers with outwardly concave or convex curvature in axial section; or spherical balls.

The rolling elements may be arranged in one or more rows.

The support members are preferably interconnected without the interposition of any other components. For example, the support members making up the endless belt may be interconnected by at least one continuous element. Alternatively, adjoining pairs of the support members may be interconnected by rigid elements such as hinges.

Figure 2:
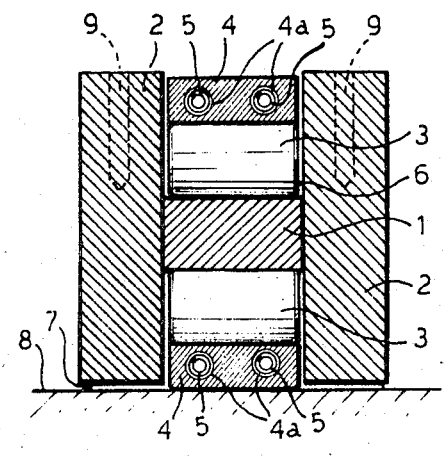

One embodiment of the invention will now be described by way of example, with reference to the accompanying drawings, in which:

FIG. 1 is a part sectional side elevation of a slide according to the invention, and FIG. 2 is a cross section on the line II—II of FIG. 1.

In the drawings, 1 indicates an elongated bearing block having parallel smooth surfaces interconnected at opposite ends by rounded semicylindrical surfaces. The block 1 is attached to two similar external walls 2 on opposite sides. A number of cylindrical rolling elements 3 roll on the surfaces of the block 1 between the walls 2.

A number of support members comprising rectangular shoes 4 are interconnected by a pair of annular flexible elastic elements 5 such as annular coiled springs extending through respective pairs of bores 4a in the shoes 4. The shoes 4 are arranged in an endless belt surrounding the rolling elements 3 and forming respective upper and lower horizontal surfaces over which the elements 3 roll. The resilience of the elements 5 causes the shoes 4 to be drawn around the rolling elements 3 with a certain adherence thereto.

Respective arcuate separating members 6, secured to the sidewalls 2, are provided at the ends of the slide, spaced from the semicylindrical ends of the block 1, for separating the shoes 4 from the rolling elements 3 over the nonlinear paths of movements of the latter.

Respective seal members 7 are carried at opposite ends of the walls 2 to provide seals preventing the ingress of foreign bodies from the working region of the machine tool between the slide and the flat bed over which it is adapted to move.

The flexible elastic elements 5 may be of metal or of suitable nonmetallic material.

The block 1 is attached to a part of a machine tool (not shown), which part is adapted to move over the machine tool bed 8, by means of bolts or the like, indicated diagrammatically at 9, secured to the sidewalls 2. The block 1 may alternatively be attached to the machine part by means which permit relative oscillations of the block 1.

The slide described herein occupies little more space than normal rolling action machine tool slides, and is not of expensive or complex construction. Moreover, the use of the endless belt formed by the shoes 4 causes the loads transmitted through the rolling elements 3 to be distributed over a number of elements.

The elements 5 may be replaced by rigid hinges between adjoining shoes 4.

More than one row of independent endless belts of support members may be provided.

I claim:

1. Slide comprising a bearing body, a number of rolling elements, and means for guiding said rolling elements for rolling movement over a surface of bearing body, wherein the improvement consists in an endless belt made up of a number of support members and means interconnecting said support members and permitting separation of the members at the extremes of the endless belt, said endless belt defining an internal surface over which said rolling elements roll.

2. Slide as claimed in claim 1, in which the means interconnecting the support members making up the endless belt comprise at least one continuous element.

3. Slide as claimed in claim 1, including arcuate retaining members which separate the rolling elements from the internal surface of said endless belt at the two extremes of the belt, where the latter moves in an arcuate path.

4. Slide as claimed in claim 3, in which respective sidewalls are secured to the bearing body and the arcuate retaining members are fixed to the respective sidewalls on opposite sides of the bearing body.

5. Slide as claimed in claim 1, in which the rolling elements are comprised of cylindrical rollers having parallel axes.

6. Slide as claimed in claim 2, in which the means interconnecting the support members comprise at least one metallic flexible and elastic element.

7. Slide as claimed in claim 2, in which the means interconnecting the support members comprise at least one nonmetallic flexible and elastic element.

* * * * *